United States Patent [19]

Batte

[11] 4,281,369
[45] Jul. 28, 1981

[54] METHOD AND APPARATUS FOR SOLAR POWER LIGHTING

[76] Inventor: Christopher L. Batte, 7816 Purdue, Dallas, Tex. 75225

[21] Appl. No.: 967,962

[22] Filed: Dec. 11, 1978

[51] Int. Cl.³ ............................ F21M 5/02; F21P 1/00
[52] U.S. Cl. ...................................... 362/183; 362/276
[58] Field of Search .................. 136/89 AC; 362/183, 362/276

[56] References Cited

U.S. PATENT DOCUMENTS

| | | | |
|---|---|---|---|
| 2,889,490 | 6/1959 | Paradise | 136/89 AC |
| 3,317,809 | 5/1967 | Bowers et al. | 362/183 |
| 4,031,385 | 6/1977 | Zerlaut et al. | 136/89 AC |
| 4,100,427 | 7/1978 | Durand et al. | 136/89 AC |
| 4,108,405 | 8/1978 | Gibson | 136/89 AC |

Primary Examiner—Brooks H. Hunt
Attorney, Agent, or Firm—Stanley R. Moore; Thomas L. Crisman

[57] ABSTRACT

Solar powered and/or augmented lighting systems embodied within conventional hollow light pole configuration incorporating a solar power lamp cell. A plurality of solar cells are disposed in an array about an upstanding light pole of conventional design of the type having a hollow interior and laterally extending lighting elements. The lighting element itself is provided in a configuration incorporating a solar cell atop a storage battery atop a light source, such as a bulb, operable from said light power system. The lighting cell is selectively powered by either a storage battery system operable in conjunction with the solar panel array and/or the solar power network incorporated therein. A network of electrical storage cells are disposed within the hollow configuration of the light pole and supported upon an elevator system for facilitating access thereto. In this manner, the overall consumption of energy from conventional power lines may be reduced and/or eliminated. The commercial lines may remain connected to said light poles for augmented power during periods of low solar energization and for purposes of original solar collector orientation.

7 Claims, 3 Drawing Figures

METHOD AND APPARATUS FOR SOLAR POWER LIGHTING

BACKGROUND OF THE INVENTION

The present invention relates to solar cells and, more particularly, to solar light panel arrays disposed about a conventional hollow light pole housing a plurality of electrical storage cells therein for collecting the solar energy and supplying lighting therefrom during the evening hours.

Lighting systems for outdoor stadiums and municipal highways have been the subject of much design effort in recent years. Particularly important is the efficiency and effectiveness of such lighting as it provides activity in the evening hours by permitting visual observation for purposes of recreation and safety. The power consumed by such light poles along the streets and highways as well as in parks and stadiums has in more recent years been a major consideration as fuel costs have driven up the price of electricity. The need for efficient and low cost lighting has thus become a predominant issue in contemporary times promoting the design of more effective, energy conscious lighting networks.

Most conventional pole lamps of commercial construction for use on city highways and parks incorporate an arc lamp lighting element. The arc lamp requires a start up time of 2–7 minutes and consumes power during this time at a very inefficient rate. For example, a 400 watt white mercury bulb requires 5 to 7 minutes of warm up time and on the order of 5 amps. Operation requires about 3 to 3.5 amps at a peak voltage of around 280 volts. Although these figures are for purposes of example only, it may be seen that energy consumption of a plurality of in-line poles would be substantial.

The utilization of solar energy has been widespread in recent times for powering hot water heaters and the electrical systems of certain houses as well as some commercial establishments. The design and development of such systems has been the subject of numerous prior art patents and technical bulletins. Such systems have, in the main, been directed toward conversion systems for converting solar heat into electrical energy or another form of energy for heating homes and buildings. One of the main areas of power consumption in our automated and somewhat "nocturnal" society is that of commercial lighting. The main requirement for such lighting is, of course, economy in installation and effectiveness in utilization. To date the effectiveness of highway lighting has been focused, in the main, in the particular light emission configurations such as bulb size, luster and color. For example, many highways are now lit by amber lighting which has been found to be more visually acceptable and energy effective. Such lighting does, however, necessitate the use of conventional power lines and standardized power consumption.

Solar cells capable of charging electrical storage batteries have for years been used and developed for various industrial applications. To date the applications for commercial lighting using solar powered cells has been limited due to various economic considerations. However, the cost of contemporary fuel has provided renewed impetus and a new cost justification for such solar collection means for commercial lighting in areas such as that described herein.

Numerous attempts have been made to effect an economic lighting system utilizing solar energy by constructing a solar power generating station and transferring electricity along power lines. Power loss through transmission lines generally renders uneconomical the utilization of remote solar power generation for lengthy transmission. Moreover, the effective utilization of remote solar power generation stations has, to date, not found widespread acceptance due to certain packaging, economical and efficiency considerations. In the particular application of street and highway lighting as well as stadium and park lighting, the localized power requirements are such that the utilization of solar power cells may be found to be more satisfactory than originally conceived when incorporated into a package facilitating ready access and control in the manner economically beneficial from a power consumption and initial cost outlay standpoint.

It would be an advantage therefore to overcome many of the problems of the prior art by providing a suitable lighting system powered by solar cells packaged in a configuration readily incorporatable into existing utility lighting system. Such as the purpose of the present invention wherein a remote solar panel array is disposed about a hollow core utility pole containing a plurality of storage batteries therein disposed on an elevator system providing access thereto. A suitable lighting source is disposed outwardly of the light pole and includes a solar collecting cell having disposed thereunder an electrical storage cell disposed atop a light source for emitting light in conjunction with a solar panel array and/or conventional power source. In this manner, high intensity or normal lighting can be provided through either solar powered cells and/or conventional power transmission for reducing the power requirements for commercial lighting in areas of residential streets, open highways, and recreation areas.

SUMMARY OF THE INVENTION

The present invention relates to solar lighting systems for utilization in conjunction with commercial light pole configurations incorporating conventional, hollow, upstanding light pole structures. More particularly, one aspect of the invention includes a remote solar panel array disposed about a light pole for tracking orientation relative to the sun for following the sun and supplying maximum power to a network of storage batteries disposed within an underlying, hollow light pole assembly. The light source further includes a separate solar collector disposed atop a storage battery disposed atop a light source electrically coupled to said network of storage batteries. In this manner, the light source may be powered by conventional power transmission means and/or by said storage batteries during hours of darkness.

In another aspect, the invention includes a light source incorporating a solar cell and storage battery electrically coupled to conventional power lines. The solar cell is utilized to "fire up" the light itself prior to being fed by the conventional power lines. In this manner, the time delay and low efficiency power consumption of start up of conventional arc lamps commonly utilized is reduced relative to the transmitted power.

In yet another aspect, the invention includes an elevator system disposed in the light pole for conveying the storage batteries thereupon an electrical communication with the solar panel array and the light source disposed outwardly thereof. An access port is provided adjacent the base of the light pole for access to the storage batteries contained therein. The batteries may be of a conventional lead, storage variety and could be manufactured to shape and size as desired. The solar panel array may likewise be provided in collapsible configuration for securement about the light pole in both a folded configuration and in an upwardly disposed, deployed configuration for facing and tracking the moving sun across the sky.

BRIEF DESCRIPTION OF THE DRAWINGS

For a more complete understanding of the present invention, and for further objects and advantages thereof, reference may be now had to the following description taken in conjunction with the accompanying drawings in which.

DETAILED DESCRIPTION

Figure 1:
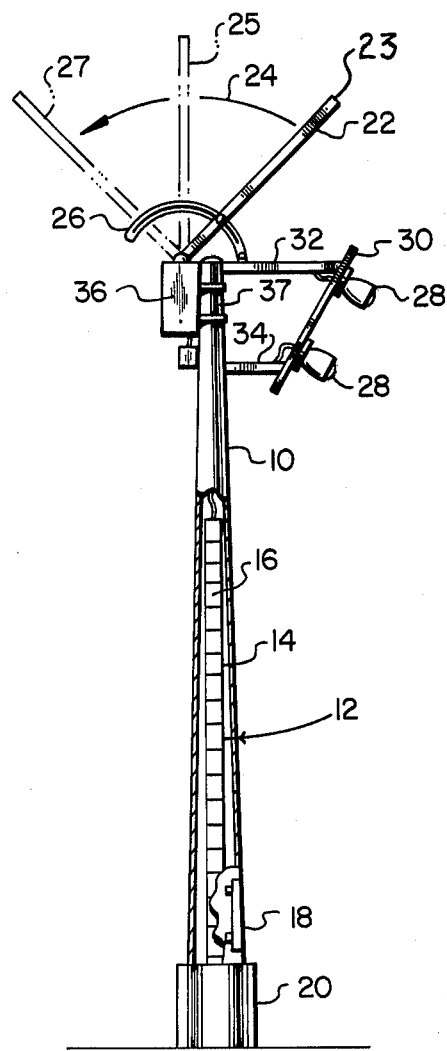
FIG. 1 is a side-elevational view of a light system incorporating the principles of the present invention and shown in partial fragmentary view for illustrating the working thereof.

Referring first to FIG. 1, there is shown a conventional light pole 10 having incorporated therewith a lighting system 12 constructed in accordance with the principles of the present invention. The lighting system 12 includes a conveyor 14 housing a plurality of electrical storage batteries 16 thereupon. An access door 18 is provided at the base 20 of the pole 10 for providing access thereto.

The lighting system 12 of the present invention includes a solar collector panel 22 housed atop the light pole 10 and constructed thereon for movement in a tracking configuration relative to the sun thereabove. The panel 22 is thus shown in three positions, 23, 25, and 27, two of which (25 and 27) are shown in phantom through an angulation pattern represented by the arrow 24. A suitable track 26 is provided for movement of the panel 22 in an arcuate path thereacross. A plurality of lights 28 are shown disposed outwardly of a paneled brace 30 secured by arms 32 and 34 from the light pole 10. Suitable tracking drive train 36 is provided adjacent the brace arms 32 and 34 for coordinating the tracking movement of the solar panel 22. Drive train 36 is coupled to a central center 37 housed within the pole 10 which sets the varying timing of the tracking operation.

Figure 2:
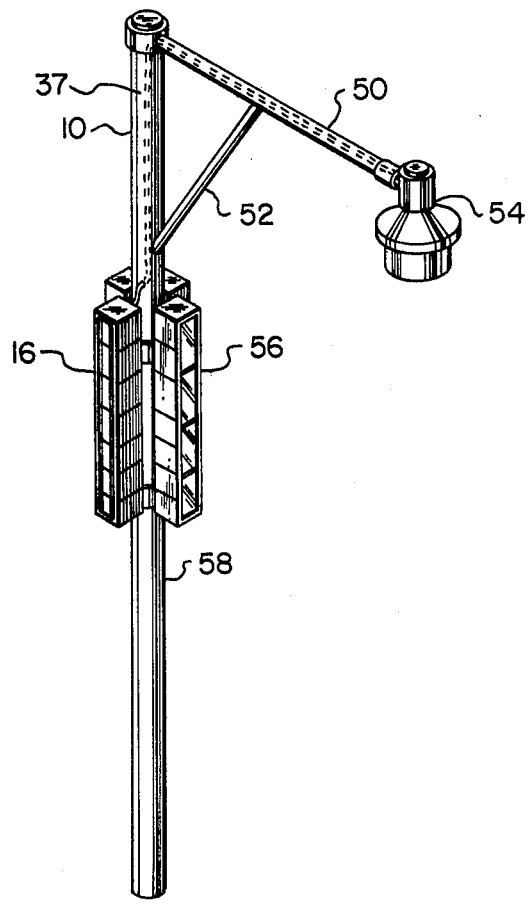
FIG. 2 is a perspective view of an alternative embodiment of the lighting system of FIG. 1.

Referring now to FIG. 2 there is shown an alternative embodiment of a light pole 10 of the street lighting variety including a cantilevered arm 50 disposed outwardly thereof and supported by an angulated support strut 52 for housing a light 54 on end thereof. A plurality of solar panels 56 are disposed along side the pole 58 and during daylight hours said panels may be deployed in upward configuration for tracking the sun in a similar manner as is shown in FIG. 1. A suitable control network 37 comprising a microcomputer of conventional design is also utilized to control the operation and energization of the system 12. In this embodiment the storage batteries 16 are secured along the outside of the pole 58 as may be necessary for existing light poles which are not large enough or compatible for internal support. In this manner, existing light structures can be retrofitted for solar power, as shown.

Figure 3:
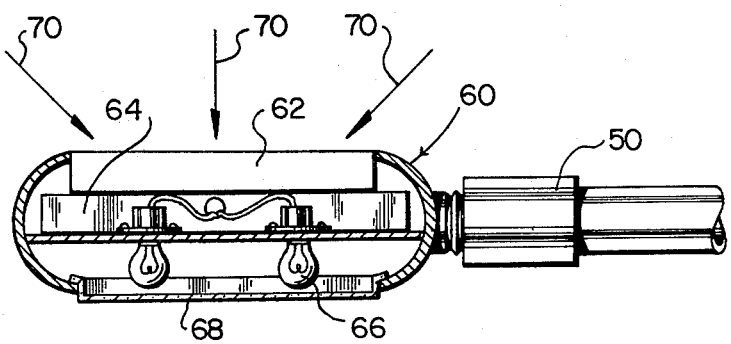
FIG. 3 is an enlarged side-elevational, cross-sectional view of a light source constructed in accordance with the principles of the present invention and designed for use in conjunction with the lighting systems of FIGS. 1 and 2.

Referring now to FIG. 3 there is shown a close up-view of a light source 60 constructed in accordance with the principles of the present invention. Light source 60 includes a solar collector 62 disposed atop a solar electrical storage cell 64 disposed atop a pair of lights 66 comprising the light source for the elements 60. A clear or transluscent light shield 68 is provided beneath the light 66 for permitting the transfer of light therethrough. The light source 60 is provided with means for mechanically and electrically attaching said light source to the light pole 10 and for being powered by either conventional power transmission lines or the storage cell 64 housed therein or the storage batteries 16 provided within said light pole. In this manner, any of three energization configurations are possible for the conservation of energy and maximum utilization of solar and conventional electrical power. In operation, the lights 28, 54 and/or 66 may be powered by conventional power supplied by power lines (NOT SHOWN) or energized by the storage cells 16 housed within the accompanying supporting light pole 10. Since such light poles 10 are conventionally hollow and necessary for support of such lighting fixtures, the present invention facilitates efficient utilization of a volume of electrical energy normally wasted in such commercial applications. For conventional lighting as that necessary for residential areas low power requirements may be supplied through the storage cell 64 disposed within the light source 60. This is particularly advantageous for "start-up" energization for more high intensity applications, such as residential lighting, special purpose "flood" lighting and/or stadium lighting, the storage cells 16 supplied in conveyor 14 may be incorporated for maximizing the available solar energy in conjunction with standard line power.

The system 12 as defined in the present invention may be utilized in conjunction with existing light poles 10 and light systems and/or constructed in new embodiments incorporating the features described herein in a more efficient configuration. For example, the arrayed solar panels 66 as shown in FIG. 2 can most effectively be utilized in conjunction with poles 10 specially adapted for such configurations although readily adaptable to existing power pole configurations. In like manner, the light source 60 as shown in FIG. 3 is constructed for receiving solar energy as indicated by the arrows 70 pointing toward the solar cell 62. This construction requires said lights 60 to be attached to the support arm 50 of a conventional light pole 10 in an outwardly cantilevered configuration to permit maximum sunlight exposure.

It is thus believed that the operation and construction of the present invention will be apparent from the foregoing description. While the apparatus as shown and described has been characterized as being preferred it will be obvious that various changes and modifications may be made therein without departing from the spirit and scope of the invention as defined in the following claims.

What is claimed is:

1. An improved lighting system illuminating an area in times of darkness of the type having an upstanding light pole of generally hollow interior construction extending from an underlying base secured upon the ground for supporting a plurality of light emitting elements thereabove wherein the improvement comprises:

a remotely disposed, moveable solar collector panel disposed about said light pole;

a tracking mechanism for orientating said collector panels relative to the sun;

a plurality of storage batteries secured to said lighting pole;

means coupling said storage batteries to said collector panel or the energization of said batteries therefrom;

means interconnecting said storage batteries to said light emitting elements for the energization thereof; and control means secured to said light pole for interconnecting said collector panel to said batteries and said batteries to said light emitting element in response to the amount of sunlight falling on said collector panels; and a conveyor elevator within said light pole housing said storage batteries therein, said light pole including an entry door for providing access to said storage batteries upon said conveyor elevator.

2. The apparatus as set forth in claim 1 wherein said collector panels are foldably configured for confinement adjacent the longitudinal periphery of the light pole during the evening hours.

3. The apparatus as set forth in claim 2 and including an electro-mechanical network for deploying said collector panels foldably confined about said light pole during daylight hours.

4. The apparatus as set forth in claim 3 and including tracking means housing with the generally hollow interior of said light pole and constructed for causing said deployed collector panels to track the sun for maximizing solar collection.

5. The method as set forth in claim 7 and including means coupling the light pole to conventional power lines for supplying power to the batteries in times of limited solar energy.

6. The method as set forth in claim 7 wherein the step of remotely disposing the solar collector panels about the light pole includes the step of foldably confining said panels adjacent the longitudinal periphery of the light pole during the evening hours.

7. A method of lighting a ground area in times of darkness with solar energy in place of conventional power lines and utilizing storage batteries and upstanding light pole comprising the steps of:

providing a solar collector upon the light pole with tracking means for orienting the collector relative to the sun;

remotely disposing the solar collector panel about an upper portion light pole;

tracking the sun with the solar collector panel;

securing the storage batteries within a conveyor elevator within the light pole and having the storage batteries thereon in a configuration facilitating elevator access thereto;

energizing the storage batteries with the solar collector panel; and energizing a light producing element received upon the light pole.

* * * * *